US012637056B2

(12) United States Patent
Singhania et al.

(10) Patent No.: US 12,637,056 B2
(45) Date of Patent: May 26, 2026

(54) CONTROLLING HIGH VOLTAGE DEVICES

(71) Applicant: Robert Bosch GmbH, Stuttgart (DE)

(72) Inventors: Aakhilesh Singhania, Ypsilanti, MI (US); Jörn Beckmann, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 18/980,957

(22) Filed: Dec. 13, 2024

(65) Prior Publication Data

US 2025/0214561 A1    Jul. 3, 2025

Related U.S. Application Data

(60) Provisional application No. 63/615,681, filed on Dec. 28, 2023.

(51) Int. Cl.
| | |
|---|---|
| *B60W 20/50* | (2016.01) |
| *B60W 20/00* | (2016.01) |
| *B60W 20/10* | (2016.01) |
| *B60W 30/00* | (2006.01) |
| *B60W 30/188* | (2012.01) |
| *B60W 30/192* | (2012.01) |

(52) U.S. Cl.
CPC ............ *B60W 20/10* (2013.01); *B60W 20/50* (2013.01); *B60W 30/1886* (2013.01); *B60W 30/192* (2013.01); *B60W 2510/242* (2013.01)

(58) Field of Classification Search
None
See application file for complete search history.

(56) References Cited

U.S. PATENT DOCUMENTS

| | | | | |
|---|---|---|---|---|
| 2013/0030621 A1* | 1/2013 | Chung | ...................... | B60L 3/04 |
| | | | | 701/22 |
| 2015/0232081 A1* | 8/2015 | Slosarczyk | ........ | G01R 31/3648 |
| | | | | 701/22 |
| 2017/0334294 A1* | 11/2017 | Chen | ....................... | H02P 27/08 |
| 2018/0334170 A1* | 11/2018 | Liu | ....................... | B60W 10/30 |
| 2022/0144243 A1* | 5/2022 | Jeong | ....................... | B60L 1/00 |

(Continued)

FOREIGN PATENT DOCUMENTS

| | | | | | |
|---|---|---|---|---|---|
| EP | | 3154115 B1 | * | 12/2021 | .......... H01M 10/482 |
| WO | WO-2023044190 A1 | | * | 3/2023 | ............... H02J 7/80 |

(Continued)

*Primary Examiner* — James M Mcpherson
(74) *Attorney, Agent, or Firm* — Michael Best & Friedrich LLP

(57) ABSTRACT

A system for controlling high voltage devices. The system includes a battery, a DC-DC converter, and an electronic processor. The electronic processor is configured to, in response to determining a partial startup condition is met, operate the system in a partial system mode and perform a full shutdown of the system in response to a failure requiring a full shutdown. The electronic processor is configured to, in response to determining a full startup condition is met, operate the system in a full system mode and, in response to a failure occurring, determine whether the full shutdown or a partial shutdown is required. The electronic processor is configured to perform the full shutdown of the system in response to determining the full shutdown is required, and, in response to determining the partial shutdown is required, perform the partial shutdown and operate the system in the partial system mode.

17 Claims, 8 Drawing Sheets

(56)                    References Cited

U.S. PATENT DOCUMENTS

2022/0239119 A1 *   7/2022  Liu ........................... H02J 7/40
2022/0407320 A1    12/2022  Filice et al.
2023/0010979 A1     1/2023  Maitre et al.
2023/0280706 A1     9/2023  Lu et al.

FOREIGN PATENT DOCUMENTS

WO      WO-2023067897 A1 *   4/2023   ............. H02J 7/663
WO         2023128748 A1     7/2023

* cited by examiner

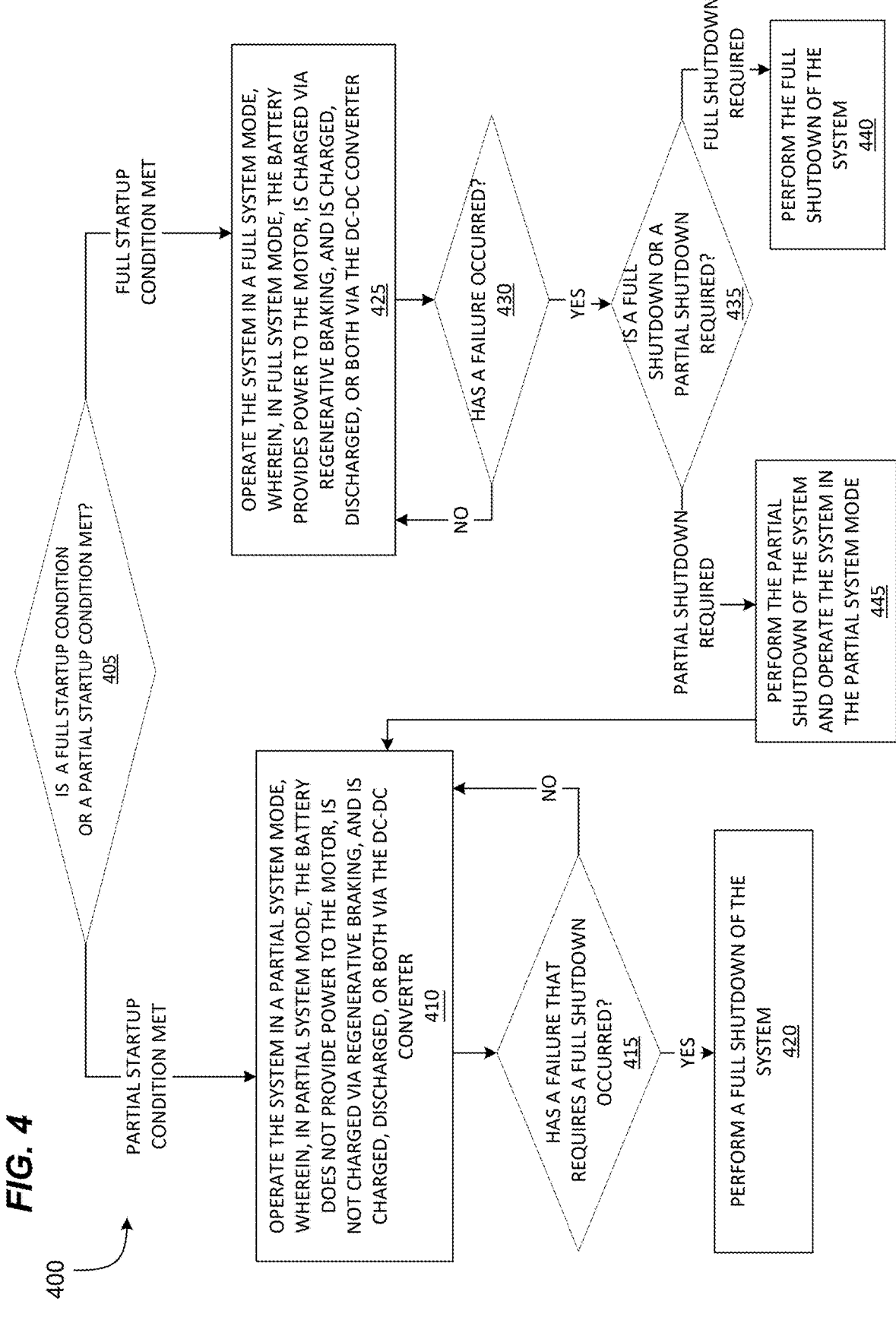

400

IS A FULL STARTUP CONDITION OR A PARTIAL STARTUP CONDITION MET? 405

PARTIAL STARTUP CONDITION MET

FULL STARTUP CONDITION MET

OPERATE THE SYSTEM IN A PARTIAL SYSTEM MODE, WHEREIN, IN PARTIAL SYSTEM MODE, THE BATTERY DOES NOT PROVIDE POWER TO THE MOTOR, IS NOT CHARGED VIA REGENERATIVE BRAKING, AND IS CHARGED, DISCHARGED, OR BOTH VIA THE DC-DC CONVERTER 410

OPERATE THE SYSTEM IN A FULL SYSTEM MODE, WHEREIN, IN FULL SYSTEM MODE, THE BATTERY PROVIDES POWER TO THE MOTOR, IS CHARGED VIA REGENERATIVE BRAKING, AND IS CHARGED, DISCHARGED, OR BOTH VIA THE DC-DC CONVERTER 425

HAS A FAILURE THAT REQUIRES A FULL SHUTDOWN OCCURRED? 415

HAS A FAILURE OCCURRED? 430

NO

YES

PERFORM A FULL SHUTDOWN OF THE SYSTEM 420

IS A FULL SHUTDOWN OR A PARTIAL SHUTDOWN REQUIRED? 435

FULL SHUTDOWN REQUIRED

PERFORM THE FULL SHUTDOWN OF THE SYSTEM 440

PARTIAL SHUTDOWN REQUIRED

PERFORM THE PARTIAL SHUTDOWN OF THE SYSTEM AND OPERATE THE SYSTEM IN THE PARTIAL SYSTEM MODE 445

NO

CONTROLLING HIGH VOLTAGE DEVICES

SUMMARY

In motor sports involving hybrid vehicles, it is useful to design high voltage devices (for example, a battery, a motor control unit ("MCU"), and DC-DC converter) to operate in different modes (sometimes referred to as "operating modes"). Designing high voltage devices to operate in different operating modes allows, for example, the battery to be charged and discharged outside of the vehicle (an example of one mode) and inside of the vehicle (an example of a second different mode), even if certain failures occur.

One implementation provides a system for controlling high voltage devices. The system includes a battery, a DC-DC converter, and an electronic processor. The electronic processor is configured to determine whether a full startup condition or a partial startup condition is met. The electronic processor is configured to, in response to determining that the partial startup condition is met, operate the system in a partial system mode and perform a full shutdown of the system in response to a failure that requires a full shutdown occurring. In partial system mode, the battery does not provide power to a motor included in a vehicle, is not charged via regenerative braking, and is charged, discharged, or both via the DC-DC converter. The electronic processor is configured to, in response to determining that the full startup condition is met, operate the system in a full system mode and, in response to a failure occurring, determine whether the full shutdown or a partial shutdown is required. The electronic processor is also configured to perform the full shutdown of the system in response to determining that the full shutdown is required, and, in response to determining that the partial shutdown is required, perform the partial shutdown and operate the system in the partial system mode. In full system mode, the battery provides power to the motor, is charged via regenerative braking, and is charged, discharged, or both via the DC-DC converter.

Another implementation provides a method for controlling high voltage devices. The method includes determining whether a full startup condition or a partial startup condition is met and, in response to determining that the partial startup condition is met, operating a system in a partial system mode, and, in response to a failure that requires a full shutdown occurring, performing a full shutdown of the system. In partial system mode, a battery does not provide power to a motor included in a vehicle, is not charged via regenerative braking, and is charged, discharged, or both via a DC-DC converter. The method also includes, in response to determining that the full startup condition is met, operating the system in a full system mode and, in response to a failure occurring, determining whether the full shutdown or a partial shutdown is required, in response to determining that the full shutdown is required, performing the full shutdown of the system, and, in response to determining that the partial shutdown is required, performing the partial shutdown and operate the system in the partial system mode. In full system mode, the battery provides power to the motor, is charged via regenerative braking, and is charged, discharged, or both via the DC-DC converter.

BRIEF DESCRIPTION OF THE DRAWINGS

Figure 1A:
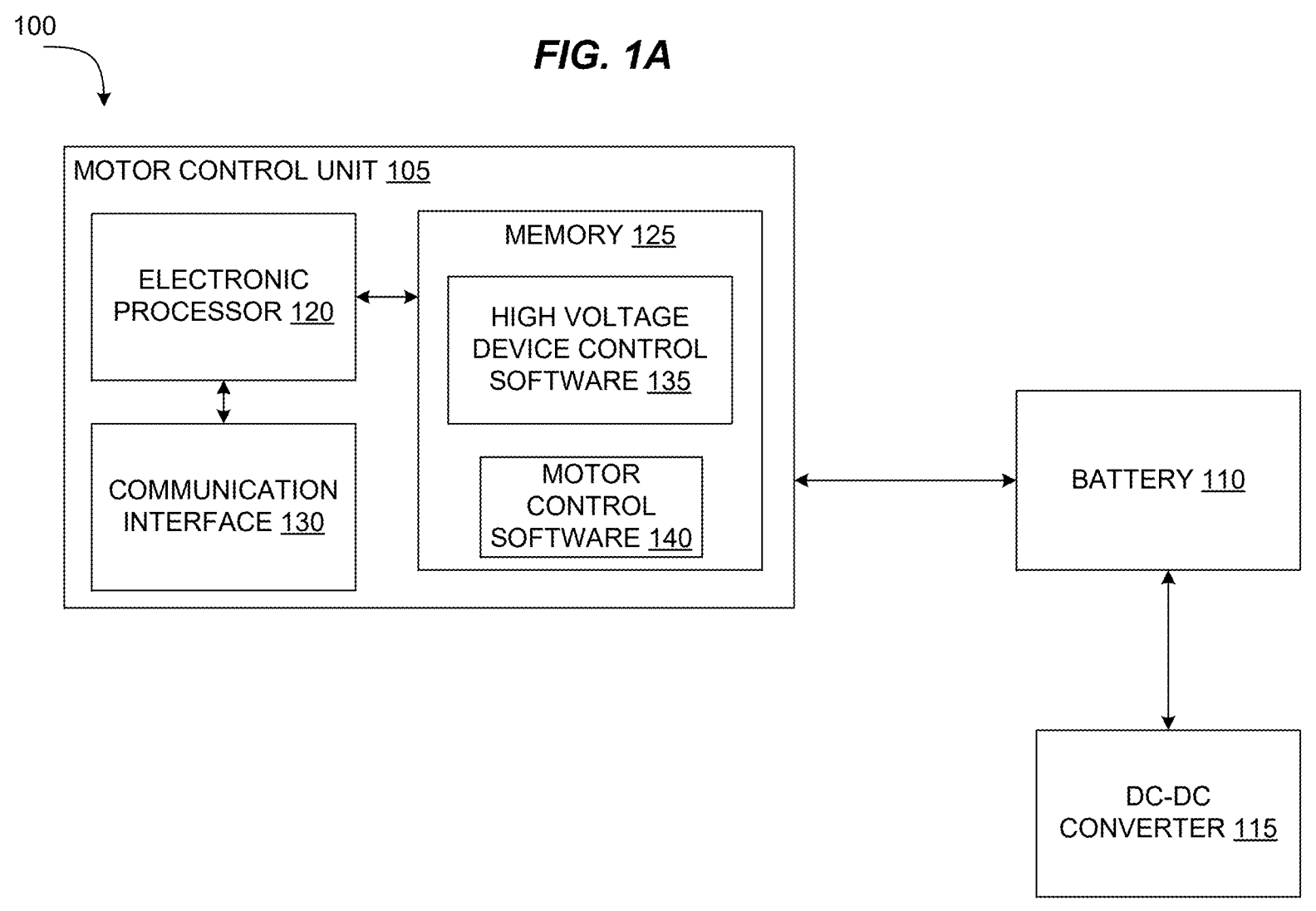

FIGS. 1A and 1B illustrate examples of a system for controlling high voltage devices.

FIG. 4 illustrates an example of a method for controlling high voltage devices.

DETAILED DESCRIPTION

Figure 1B:
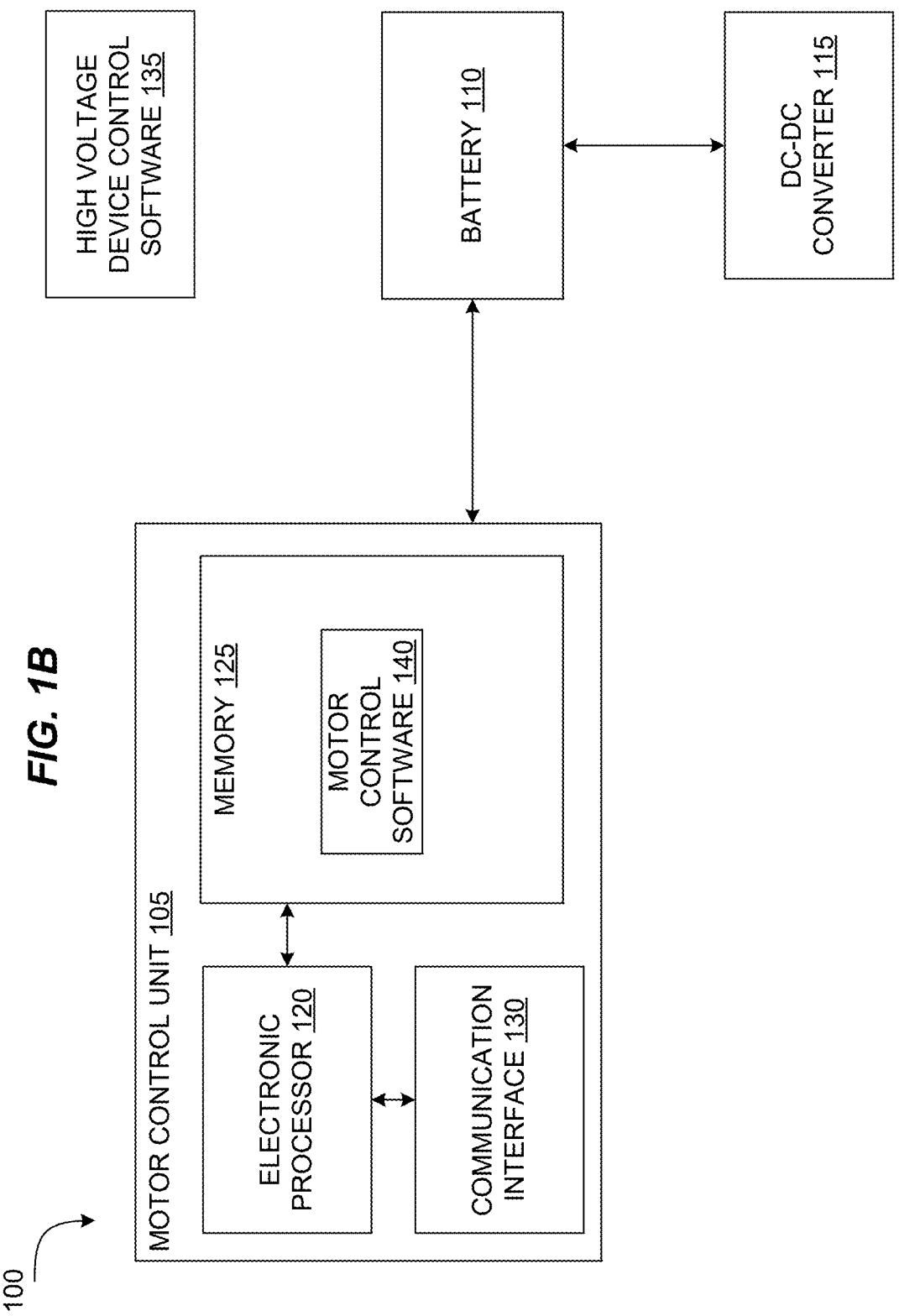

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1A and FIG. 1B provide an illustrative example of a system 100 for controlling high voltage devices. In some implementations, the system 100 includes a motor control unit ("MCU") 105, a battery 110, and a DC-DC converter 115. In some implementations, the MCU 105, the battery 110, and the DC-DC converter 115 are high voltage devices. In some implementations, for example when the MCU 105, the battery 110, and the DC-DC converter 115 are included in a vehicle, the MCU 105, the battery 110, and the DC-DC converter 115 may be connected to a hybrid control unit ("HCU"). In some implementations, the battery 110 includes three contactors. The components of the system 100, along with other various modules and components are electrically and communicatively coupled to each other via direct connections or by or through one or more control or data buses, which enable communication therebetween. In some instances, the bus that connects the modules and components is a Controller Area Network (CAN™) bus. In some instances, the bus that connects the modules and components is an automotive Ethernet™, a FlexRay™ communications bus, or another suitable bus. In alternative instances, some or all of the components of the system 100 may be communicatively coupled using suitable wireless modalities (for example, Bluetooth™ or near field communication connections).

In some implementations, the MCU 105 includes an electronic processor 120 (for example, a microprocessor, application specific integrated circuit, etc.), a memory 125, and a communication interface 130. The memory 125 may be made up of one or more non-transitory computer-readable media and include at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 120 is coupled to the memory 125 and the communication interface 130. The electronic processor 120 sends and receives information (for example, from the memory 125 and/or the communication interface 130) and processes the information by executing one or more software instructions or modules, capable of being stored in the memory 125, or another non-transitory computer readable medium. The software can include firmware, one or more applications, program data, filters, rules, one or more program modules, and other executable instructions. The electronic processor 120 is configured to retrieve from the memory 125 and execute, among other things, software for performing methods as described herein. In the example illustrated in FIG. 1A, the memory 125 stores, among other things, high voltage device control software 135 and motor control software 140. In some implementations, the electronic processor 120 performs the functionality described below in relation to FIG. 4 when the electronic processor 120 executes the high voltage device control software 135. In other examples, such as the example illustrated in FIG. 1B, the high voltage device control software 135 may be stored in a memory other than the memory 125 included in the MCU 105. For example, the high voltage device control software 135 may be included in a memory included in the battery 110, a memory included in the DC-DC converter 115, or a memory included in another electronic device included in the system 100. In some implementations, the high voltage device control software 135 may be executed by an electronic processor included in the system 100 other than the electronic processor 120 included in the MCU 105 to perform the functionality described below in relation to FIG. 4. In some implementations, when the electronic processor 120 executes the motor control software 140, the electronic processor 120 may control the operation of a motor (for example, the motor 230 illustrated in FIG. 2 which may be an electric motor). The communication interface 130 transmits and receives information from devices external to the MCU 105 (for example, components of the vehicle 200 described below).

Figure 2:
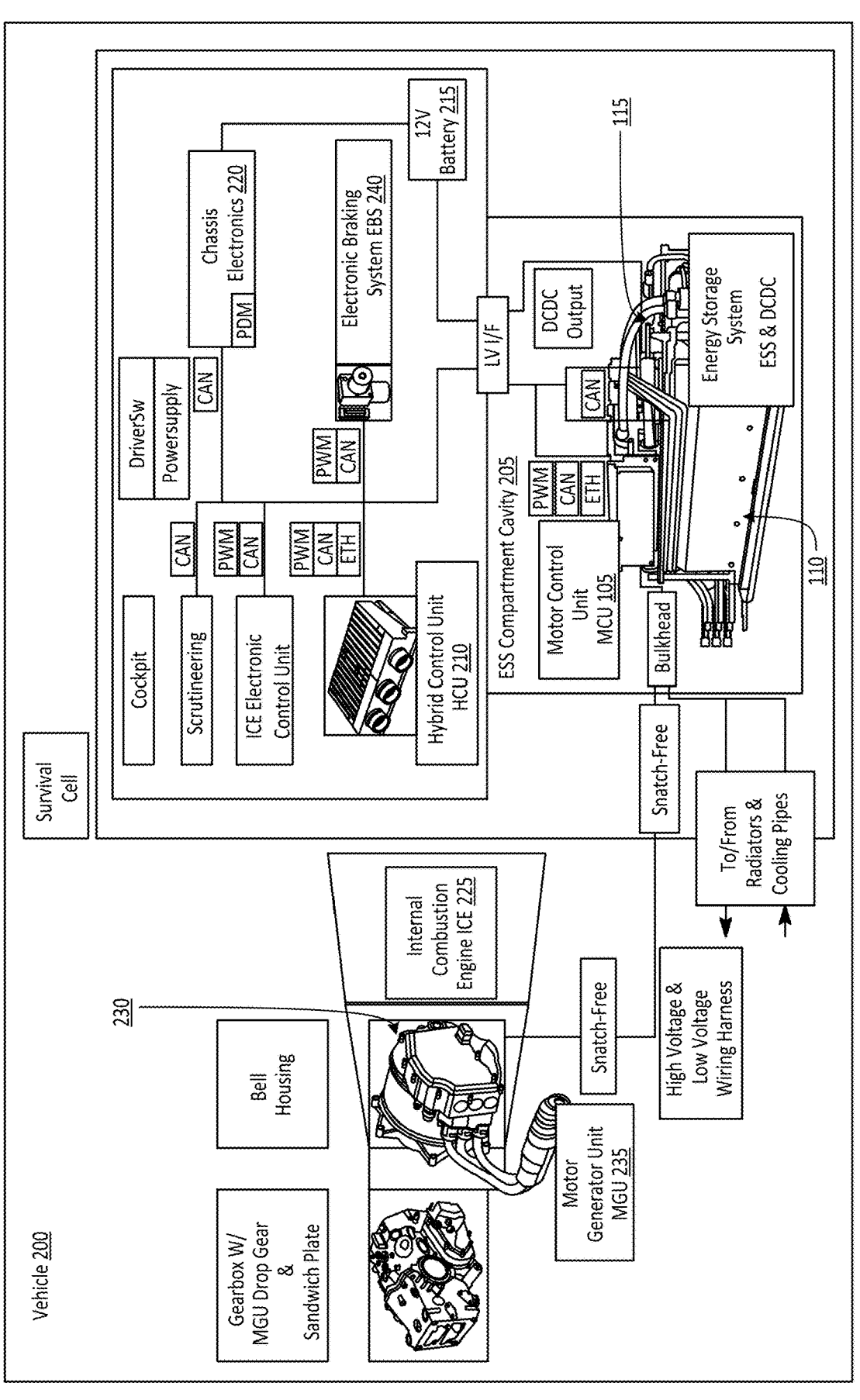
FIG. 2 illustrates an example of a vehicle including a system architected in accordance with the teachings of FIGS. 1A and 1B.
Figure 3:
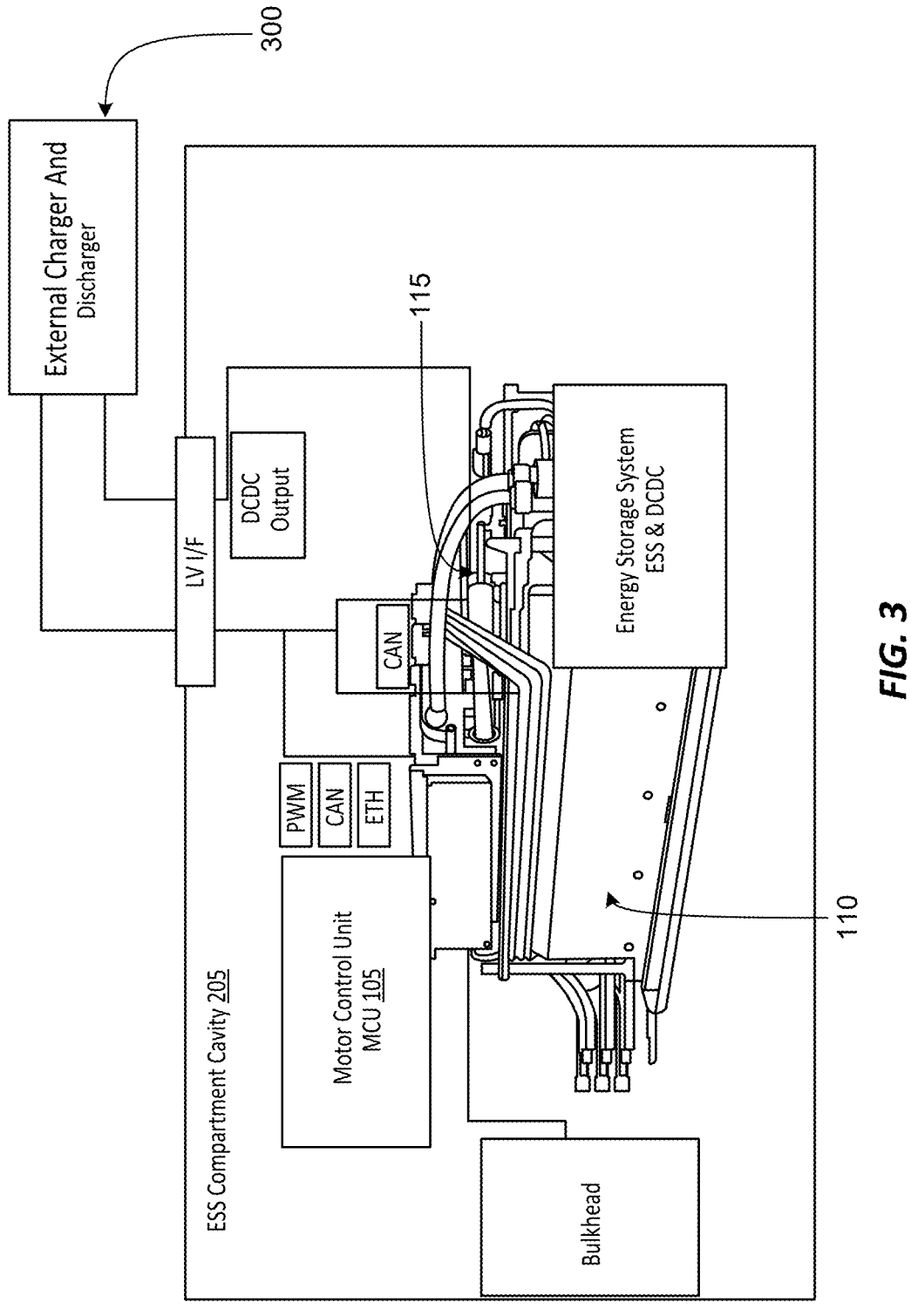
FIG. 3 illustrates an example of charging/discharging a battery of the system of FIGS. 1A and 1B external to a vehicle.

FIG. 2 provides an illustrative example of a vehicle 200 that the system 100 may be included in. The vehicle 200 may be a vehicle designed to compete in motor sport events and racing competitions or series, for example, Formula 1, Formula 2, and other racing series sanctioned or governed by various governing entities. As illustrated in FIG. 2, the components of the system 100 may be included in an electrical storage system ("ESS") compartment cavity 205. In some implementations, the ESS compartment cavity 205 is configured so that it may be removed from the vehicle 200. In some implementations, the ESS compartment cavity 205 may be removed from the vehicle 200 when the battery 110 needs to be charged, when a component included in the ESS compartment cavity 205 requires maintenance, or the like. FIG. 3 is a block diagram illustrating an example of the ESS compartment cavity 205 removed from the vehicle 200 and connected to an external charging and discharging device 300. In some implementations, the external charging and discharging device 300 is configured to charge or discharge the battery 110 included in the ESS compartment cavity 205 when the ESS compartment cavity 205 is located outside of the vehicle 200. The battery 110 may be discharged to, for example, comply with a regulated state of charge. For example, the battery 110 may be required to be equal to or less than a regulated state of charge of thirty percent when the battery is being transported at a racing competition while outside of the vehicle 200. In some implementations, when the ESS compartment cavity 205 is located outside of the vehicle 200 and the charging or discharging of the battery 110 is complete, the electronic processor 120 performs a full shutdown of the system 100 (described in further detail below).

When the ESS compartment cavity 205 is outside of the vehicle 200, the components of the system 100 included in the ESS compartment cavity 205 may be disconnected from the components of the vehicle 200 that are not included in the ESS compartment cavity 205. For example, when the ESS compartment cavity 205 is included in the vehicle 200, the MCU 105, the battery 110, and the DC-DC converter 115 may be connected to the hybrid control unit ("HCU") 210. When the ESS compartment cavity 205 is outside of the vehicle 200, the MCU 105, the battery 110, and the DC-DC converter 115 may be disconnected from the HCU 210.

The vehicle 200 may include a low voltage battery 215 that is not included in the ESS compartment cavity 205. The low voltage battery 215 may provide power to the chassis electronics 220 of the vehicle 200. In some implementations, the low voltage battery 215 is charged via the DC-DC converter 115. Therefore, if the battery 110 is unable to provide power to the components of the vehicle 200 due to, for example, a failure, the DC-DC converter 115, the low voltage battery 215, and an internal combustion engine ("ICE") 225 allow the vehicle 200 to operate on a basic level. For example, when a failure that prevents the battery 110 from providing power to the motor 230 occurs while the vehicle 200 is on a racetrack, the low voltage battery 215 and the internal combustion engine 225 may enable the vehicle 200 to move, on its own, from the track to the pits. In some implementations, the DC-DC converter 115 is bidirectional and the battery 110 (a high voltage battery) may be charged using the low voltage battery 215, via the DC-DC converter 115.

Figure 5A:
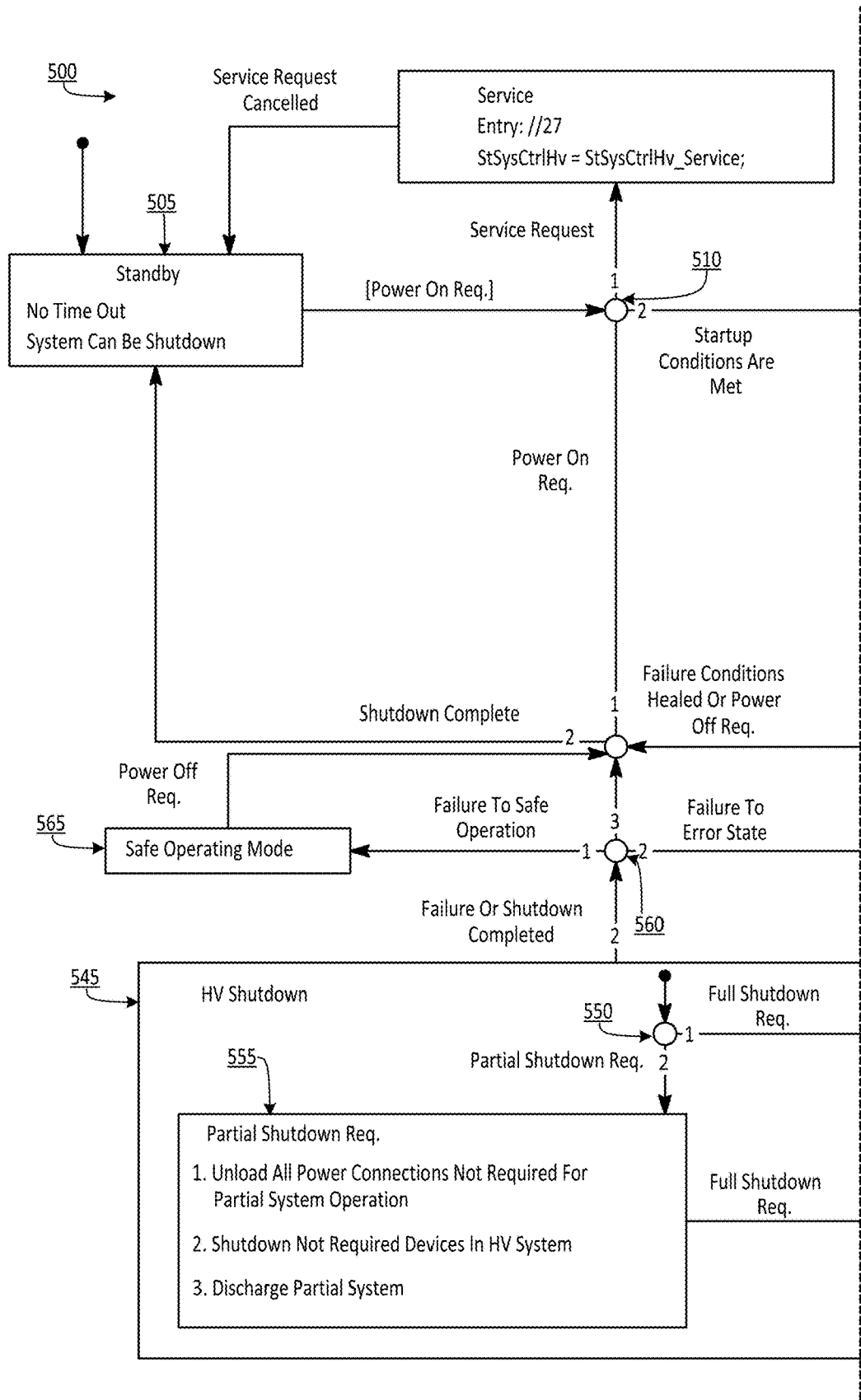
FIGS. 5A-5C illustrate an example flowchart of functionality provided by the system of FIGS. 1A and 1B.
Figure 5B:
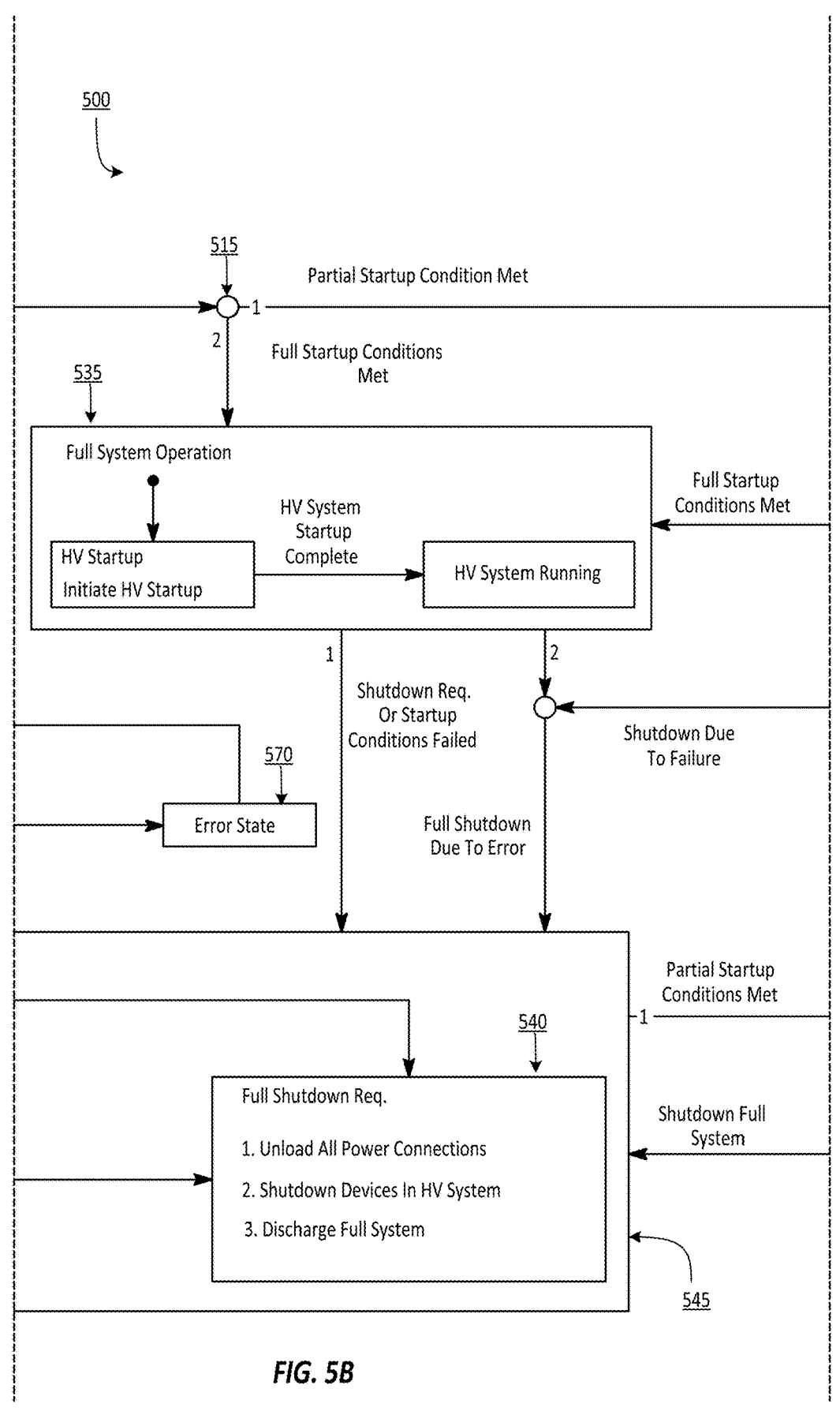
Figure 5C:
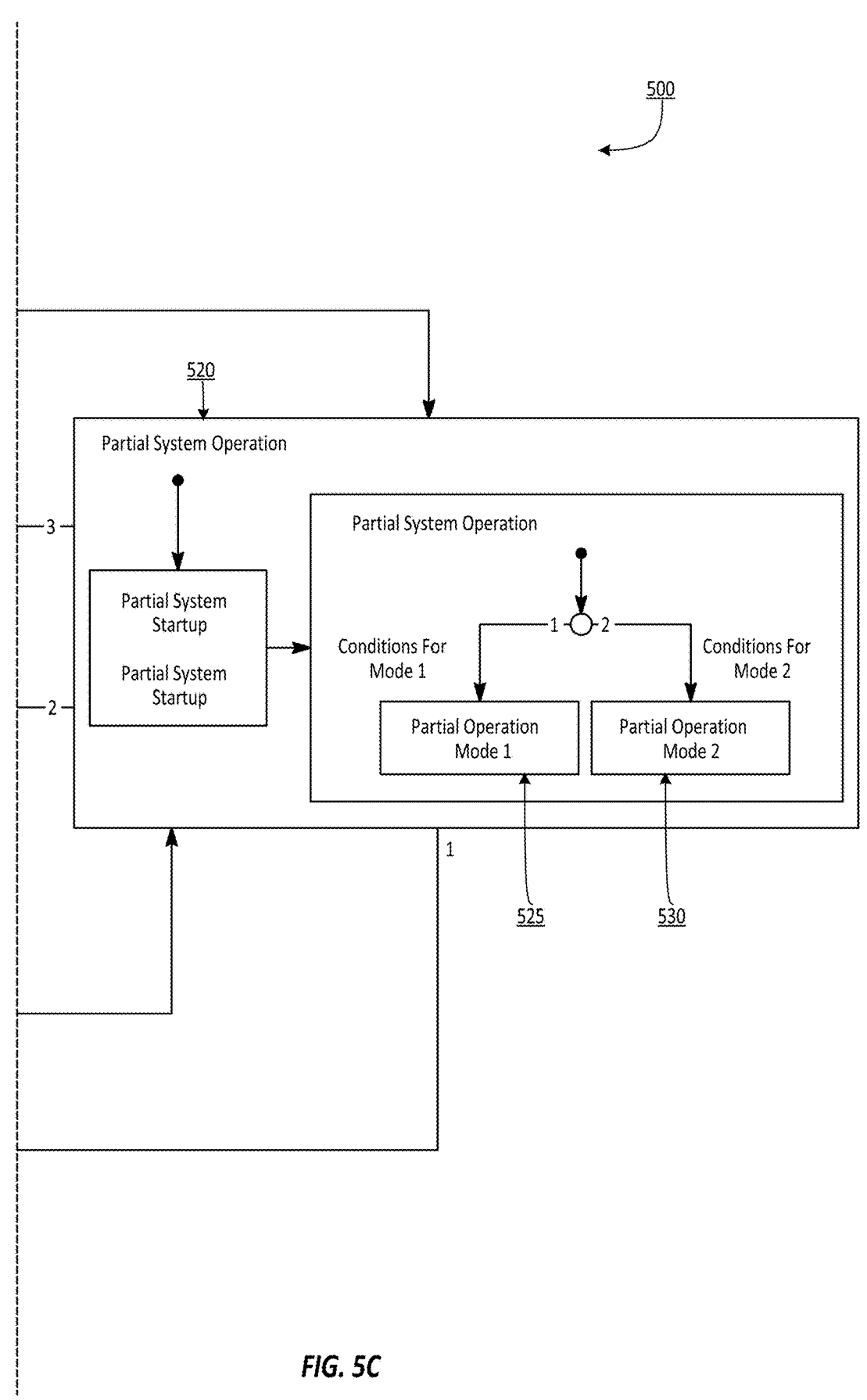

FIG. 4 provides an example method 400 for controlling high voltage devices. FIGS. 5A-5C provide another example flowchart 500 of the functionality provided by the system 100 and the method 400. In some implementations, the method 400 begins when the electronic processor 120 receives a command to power on the system 100. When the electronic processor 120 receives the command to power on the system 100, the electronic processor 120 may determine whether startup conditions are met. When a power on request is received, that request causes the electronic processor 120 to cease operating the system 100 in a standby mode (represented in FIG. 5A as block 505) and to make a determination as to whether startup conditions are met (the determination as to whether startup conditions are met is represented in FIG. 5A by decision node 510). In response to determining that the startup conditions are met, the electronic processor 120 may, at step 405, determine whether a full startup condition or a partial startup condition is met (the determination by the electronic processor 120 of whether a full startup condition or a partial startup condition is met is represented in FIG. 5B by decision node 515). In some implementations, the partial startup condition is met when 1) the system 100 is outside of a vehicle and connected to a charger unit (for example the external charging and discharging device 300), 2) only the DC-DC converter 115 is being used to charge and discharge the battery 110, or 3) a failure condition preventing the battery 110 from providing power to a motor (for example, the motor 230 included in the motor generator unit ("MGU") 235 illustrated in FIG. 2) and/or a MCU (for example, the MCU 105) of the vehicle 200 exists. In FIG. 5A and FIG. 5B, in response to determining the startup conditions are met, the state information is provided from decision node 510 to decision node 515. In response to determining that the partial startup condition is met, the electronic processor 120, at step 410, operates the system 100 in a partial system mode (represented in FIG. 5C as block 520). In some implementations, when the electronic processor 120 operates the system 100 in partial system mode, the battery 110 does not provide power to the motor 230 included in the vehicle 200 and is not charged via regenerative braking (for example, the regenerative braking normally performed when the electronic braking system ("EBS") 240 is operated). However, when the system 100 is operating in partial system mode the battery 110 may be charged, discharged, or both via the DC-DC converter 115.

In some implementations, when the electronic processor 120 operates the system 100 in partial system mode, the electronic processor 120 operates the system 100 in a first partial system operation mode (represented in FIG. 5C by block 525) or a second partial system operation mode (represented in FIG. 5C by block 530). In some implementations, the electronic processor 120 operates the system 100 in a first partial system operation mode when the system 100 is outside of the vehicle 200 and connected to a charging unit (for example, the external charging and discharging device 300). The electronic processor 120 may operate the system 100 in a second partial system operation mode when a failure occurs that requires a partial shutdown.

In some implementations, when the system 100 is operating in partial system mode and the electronic processor 120 determines that a full startup condition is met, the electronic processor 120 begins to operate the system 100 in full system mode (described below).

In some implementations, at step 415, while the system 100 is operating in partial system mode, the electronic processor 120 checks or determines whether a failure that requires a full shutdown has occurred. When a failure that requires a full shutdown occurs, the electronic processor 120 may, at step 420, perform a full shutdown of the system 100. For example, when electronic processor 120 does not receive communications from the battery 110 (for example, an electronic computing device associated with the battery 110 has become unresponsive), the electronic processor 120 may determine that a failure requiring a full shutdown has occurred. In some implementations, the electronic processor 120 performs a full shutdown of the system 100 by unloading each power connection included in the system 100, shutting down each high voltage device included in the system 100, and discharging each high voltage device included in the system 100.

Returning to step 405, the electronic processor 120, in response to determining that a full startup condition is met, performs step 425. At step 425, the electronic processor 120, operates the system in a full system mode (represented in FIG. 5B as block 535). In full system mode, the battery 110 provides power to the motor 230, is charged via regenerative braking, and is charged, discharged, or both via the DC-DC converter 115. At step 430, while the system 100 is operating in full system mode, the electronic processor 120 checks or determines whether a failure has occurred. The electronic processor 120 may determine that a failure has occurred when a startup of the system 100 cannot be completed, when a shutdown of the system 100 cannot be completed, when the voltage of one of the devices of the system 100 differs from the voltage of the other devices included in the system 100, when a crucial sensor included in the system 100 fails, and the like.

In response to determining that a failure has occurred, the electronic processor 120, at step 435, may determine whether the failure that has occurred is a type of failure that requires a partial shutdown (for example, a failure associated with the motor 230 or the operation of the motor 230 by the MCU 105) or a type of failure that requires a full shutdown (the determination as to whether the failure that has occurred is a type of failure that requires a partial shutdown or a type of failure that requires a full shutdown is represented in FIG. 5A as decision node 550). In response to determining that a full shutdown is required, the electronic processor 120, at step 440, may perform a full shutdown of the system 100 (performance of a full shutdown is represented in FIG. 5B by block 540).

In response to determining that a partial shutdown is required, the electronic processor 120, at step 445, may perform the partial shutdown of the system 100 (performance of a partial shutdown is represented in FIG. 5A by block 555) and proceed to operate the system 100 in the partial system mode. In some implementations, after performing step 445, the electronic processor 120 returns to step 410. In some implementations, the electronic processor 120 performs in the partial shutdown of the system 100 by unloading one or more power connections that are not needed to operate the system 100 in partial system mode (for example, power connections involved in providing power to the motor 230), shutting down one or more high voltage devices included in the system 100 that are not required to operate the system 100 in partial operation mode (for example, one or more high voltage devices that are responsible for controlling and providing power to the motor 230), and discharging one or more high voltage devices included in the system 100 (for example, high voltage devices responsible for controlling and providing power to the motor 230). In some implementations, if a failure that requires a full shutdown occurs while the electronic processor 120 is performing the partial shutdown, the electronic processor 120 may perform a full shutdown. In some implementations, steps 435, 440, and 445 are performed by the electronic processor 120, when the electronic processor 120 operates the system 100 in a shutdown mode (represented in FIG. 5A and FIG. 5B by block 545).

In some implementations, when the electronic processor 120 completes a full shutdown of the system 100, the electronic processor 120 may determine whether the failure that caused the full shutdown of the system 100, is a type of failure that requires the system 100 to operate in a safe operation mode. In FIG. 5A, the determination of whether the failure that caused the full shutdown of the system 100 is a type of failure that requires the system 100 to operate in a safe operation mode is represented by decision node 560. When the failure that caused the full shutdown of the system 100, is a type of failure that requires the system 100 to operate in a safe operation mode, the electronic processor 120 may operate the system in the safe operation mode (represented in FIG. 5A by block 565). In some implementations, when the system 100 is operated in safe operating mode, voltage from the battery 110 is kept below a predetermined threshold. For example, the electronic processor 120 may operate the system 100 in the safe operation mode when a failure occurs due to the temperature of a cell included in the battery 110 exceeding a predetermined threshold. In another example, the electronic processor 120 may operate the system 100 in the safe operation mode when a failure occurs due to the vehicle 200 being involved in a crash.

When the failure that caused the full shutdown of the system 100, is not a type of failure that requires the system 100 to operate in a safe operation mode, the system 100 may be in an error state (represented in FIG. 5B by block 570).

In response to failure conditions healing while the system 100 is an error state, the electronic processor 120 may proceed to check whether the startup conditions are met and, when the startup conditions are met, perform the method 400. For example, when the failure occurred because the temperature of the battery 110 exceeded a predetermined threshold, and while the system 100 is in the error state, the temperature of the battery 110 drops below the predetermined threshold, the electronic processor 120 may proceed to check whether the startup conditions are met.

Thus, examples, aspects, and features herein provide, among other things, systems and methods for controlling high voltage devices.

What is claimed is:

1. A system for controlling high voltage devices, the system comprising:
   a battery;
   a DC-DC converter; and
   an electronic processor, the electronic processor configured to:
      determine whether a full startup condition or a partial startup condition is met;
      in response to determining that the partial startup condition is met,
         operate the system in a partial system mode, wherein, in partial system mode, the battery does not provide power to a motor included in a vehicle, is not charged via regenerative braking, and is charged, discharged, or both via the DC-DC converter; and
         in response to a failure that requires a full shutdown occurring, perform a full shutdown of the system; and
      in response to determining that the full startup condition is met,
         operate the system in a full system mode, wherein, in full system mode, the battery provides power to the motor, is charged via regenerative braking, and is charged, discharged, or both via the DC-DC converter; and
         in response to a failure occurring,
            determine whether the full shutdown or a partial shutdown is required;
            in response to determining that the full shutdown is required, perform the full shutdown of the system; and
            in response to determining that the partial shutdown is required, perform the partial shutdown and operate the system in the partial system mode.

2. The system according to claim 1, wherein the partial startup condition is met when 1) the system is outside of a vehicle and connected to a charger unit, 2) only the DC-DC converter is being used to charge and discharge the battery, or 3) a failure condition preventing the battery from providing power to the motor and a motor control unit of the vehicle exists.

3. The system according to claim 1 wherein the electronic processor is further configured to:
   determine whether startup conditions are met; and
   in response to determining that the startup conditions are met, determine whether the full startup condition or the partial startup condition is met.

4. The system according to claim 1, wherein the electronic processor is configured to perform a full shutdown of the system by:
   unloading each power connection included in the system;

shutting down each high voltage device included in the system; and discharging the system.

5. The system according to claim 1, wherein the electronic processor is configured to perform a partial shutdown of the system by:

unloading one or more power connections that are not needed to operate the system in partial system mode;

shutting down one or more high voltage devices included in the system that are not required to operate the system in partial operation mode; and discharging the one or more high voltage devices included in the system that are not required to operate the system in partial operation mode.

6. The system according to claim 1, wherein the electronic processor is configured to operate the vehicle in a partial system mode by:

operating the system in a first partial system operation mode when the system is outside of the vehicle and connected to a charger unit; and operating the system in a second partial system operation mode when a failure occurs that requires a partial shutdown.

7. The system according to claim 1, wherein the electronic processor is further configured to:

in response to determining that a failure that requires the system to be operated in a safe operation mode has occurred, operate the system in the safe operation mode, wherein, in safe operating mode, voltage from the battery is kept below a predetermined threshold.

8. The system according to claim 1, the system further comprising:

a motor control unit, the motor control unit including the electronic processor.

9. A method for controlling high voltage devices, the method comprising:

determining whether a full startup condition or a partial startup condition is met;

in response to determining that the partial startup condition is met, operating a system in a partial system mode, wherein, in partial system mode, a battery does not provide power to a motor included in a vehicle, is not charged via regenerative braking, and is charged, discharged, or both via a DC-DC converter; and in response to a failure that requires a full shutdown occurring, performing a full shutdown of the system; and in response to determining that the full startup condition is met, operating the system in a full system mode, wherein, in full system mode, the battery provides power to the motor, is charged via regenerative braking, and is charged, discharged, or both via the DC-DC converter; and in response to a failure occurring, determining whether the full shutdown or a partial shutdown is required;

in response to determining that the full shutdown is required, performing the full shutdown of the system; and in response to determining that the partial shutdown is required, performing the partial shutdown and operate the system in the partial system mode.

10. The method according to claim 9, wherein the partial startup condition is met when 1) the system is outside of a vehicle and connected to a charger unit, 2) only the DC-DC converter is being used to charge and discharge the battery, or 3) a failure condition preventing the battery from providing power to the motor and a motor control unit of the vehicle exists.

11. The method according to claim 9, the method further comprising:

determining whether startup conditions are met; and in response to determining that the startup conditions are met, determine whether the full startup condition or the partial startup condition is met.

12. The method according to claim 9, wherein performing a full shutdown of the system includes:

unloading each power connection included in the system;

shutting down each high voltage device included in the system; and discharging the system.

13. The method according to claim 9, wherein performing a partial shutdown of the system includes:

unloading one or more power connections that are not needed to operate the system in partial system mode;

shutting down one or more high voltage devices included in the system that are not required to operate the system in partial operation mode; and discharging the one or more high voltage devices included in the system that are not required to operate the system in partial operation mode.

14. The method according to claim 9, wherein operating the vehicle in a partial system mode includes:

operating the system in a first partial system operation mode when the system is outside of the vehicle and connected to a charger unit; and operating the system in a second partial system operation mode when a failure occurs that requires a partial shutdown.

15. The method according to claim 9, the method further comprising:

in response to determining that a failure that requires the system to be operated in a safe operation mode has occurred, operate the system in the safe operation mode, wherein, in safe operating mode, voltage from the battery is kept below a predetermined threshold.

16. The method according to claim 9, wherein the system includes one or more high voltage devices.

17. The method according to claim 16, wherein the one or more high voltage devices include a battery a DC-DC converter, and a motor control unit.

* * * * *